J. McC. SELDEN.
CATALYZING APPARATUS.
APPLICATION FILED MAR. 22, 1918.
1,427,554.
Patented Aug. 29, 1922.
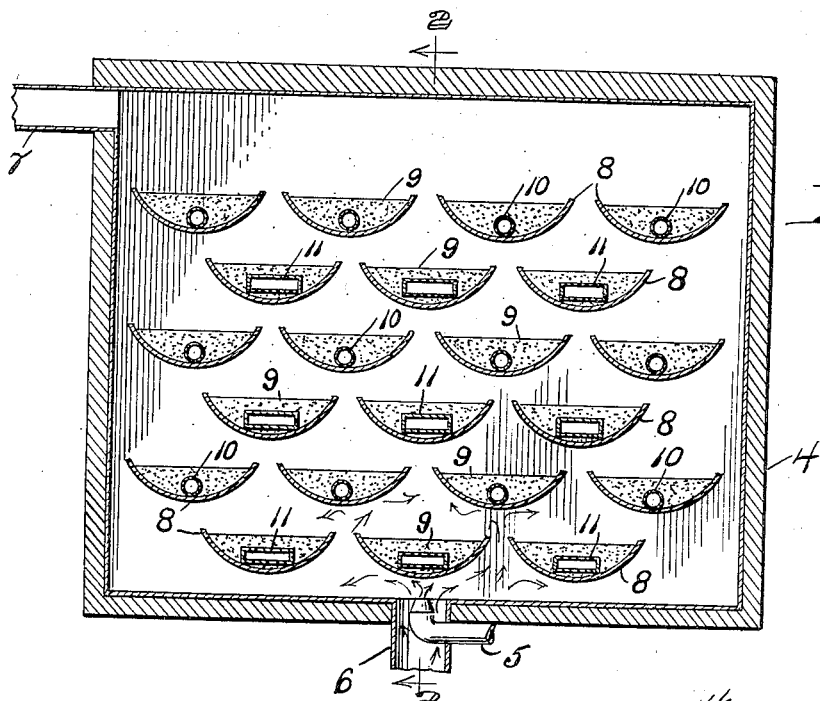
Fig. 1.
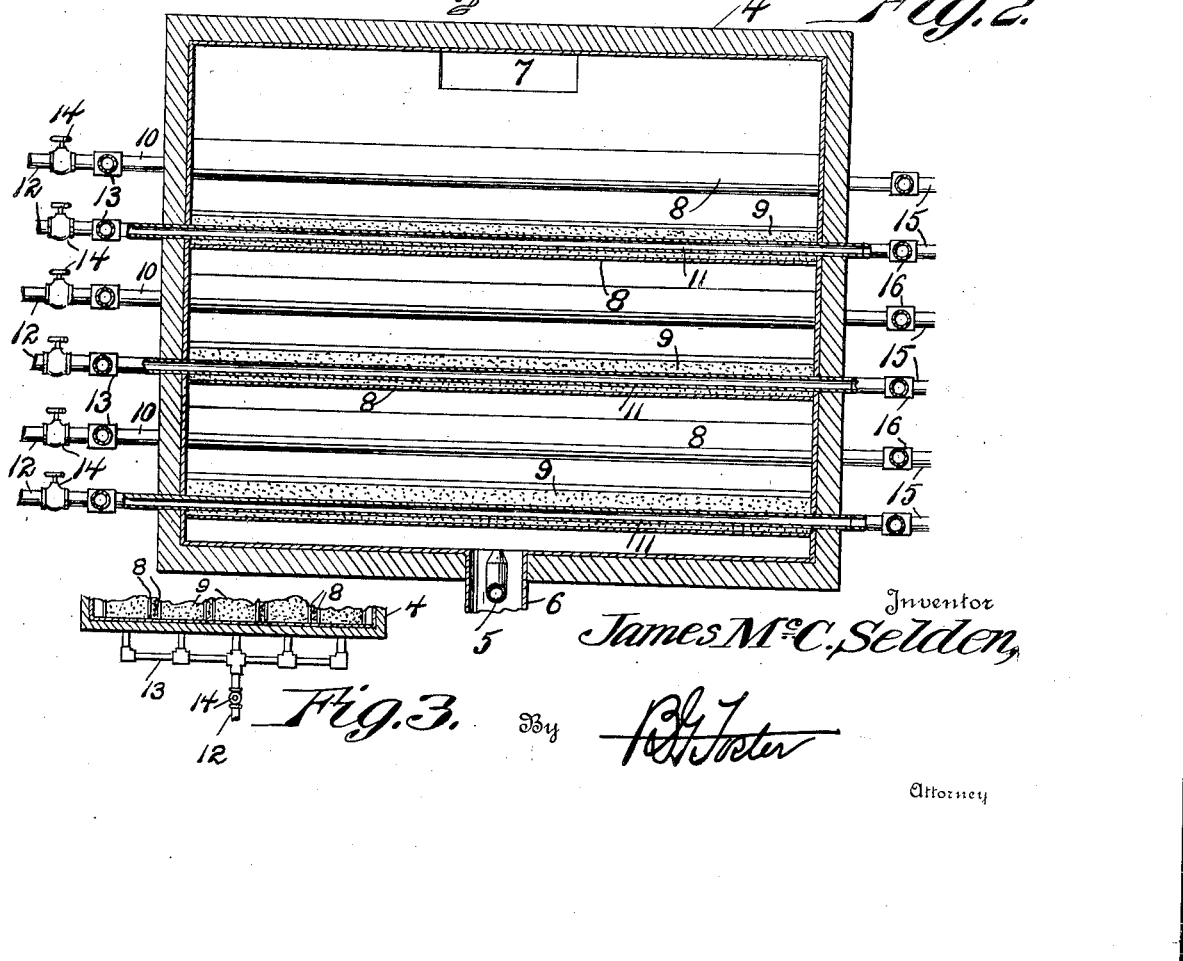
Fig. 2.
Fig. 3.
Inventor
James McC. Selden,
By
Attorney

UNITED STATES PATENT OFFICE.

JAMES McCOBB SELDEN, OF PITTSBURGH, PENNSYLVANIA, ASSIGNOR TO THE SELDEN COMPANY, OF PITTSBURGH, PENNSYLVANIA, A CORPORATION OF PENNSYLVANIA.

CATALYZING APPARATUS.

1,427,554.   Specification of Letters Patent.   Patented Aug. 29, 1922.

Application filed March 22, 1918. Serial No. 223,990.

*To all whom it may concern:*

Be it known that I, JAMES McCOBB SELDEN, a citizen of the United States, residing at Pittsburgh, in the county of Allegheny and State of Pennsylvania, have invented certain new and useful Improvements in Catalyzing Apparatus, of which the following is a specification.

The present invention relates to catalyzing apparatus, and more particularly for the oxidation of the vapors of certain hydrocarbons or their derivatives, as naphthalene, anthracene, phenanthrene, toluene and the like.

The object is to provide apparatus of this character, in which the materials in vaporous form will have free flow and ready access to the catalysts, and to provide means for maintaining the catalysts at any desired temperature.

In the accompanying drawings;

Figure 1 is a vertical sectional view of one embodiment of the invention.

Figure 2 is a view at right angles thereto, on the line 2—2 of Figure 1, and

Figure 3 is a detail horizontal sectional view on a smaller scale.

Similar reference numerals designate corresponding parts in all the figures of the drawings.

In the embodiment illustrated, a suitable casing 4 is employed, the vapors to be treated being introduced into the bottom thereof by any suitable means, as by a conduit 5. There is preferably also provided a conduit 6 for introducing an oxydizing medium, as air or other oxygen containing gas. An outlet for the treated vapors opens from the upper portion of the casing, and is designated 7.

Within the casing and extending completely across the same, are rows of catalyst holders 8 preferably in the form of relatively shallow troughs, the troughs of the different rows being disposed in staggered relation. That is to say, the troughs of the rows above and below a certain row extend over and beneath the spaces between the troughs of that particular row. Any number of troughs may be employed, as desired, and the effect, as shown in Figure 1, is the provision of a series of tortuous channels, the bottoms of the troughs constituting baffles which interrupt the flow of the vapors, causing it to pass in opposite directions over the catalyst contained in the troughs. The catalyst is designated by the reference numeral 9.

In order to maintain the catalyst at any desired temperature, conduits are associated with the troughs, preferably being located in the bottoms thereof, and extending longitudinally from end to end. These conduits may be of various shapes in cross section. Thus ordinary pipes are shown at 10, and conduits rectangular in cross section may be employed, as illustrated at 11. A suitable cooling or heating medium is supplied from any suitable source to these conduits. Thus supply pipes 12 are illustrated, the same being connected to manifolds 13 which are in turn connected to the pipes 10 and 11. Controlling valves 14 are located in the pipes 12. These are preferably arranged on one side of the casing, and suitable discharge pipes 15 are connected to manifolds 16, through which the medium can be carried to any point of discharge. This medium may be water or air, as desired.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

Having thus fully described my invention, what I claim as new, and desire to secure by Letters Patent, is:—

1. In catalyzing apparatus, the combination with a casing, of means for supplying material to be catalyzed thereto, and means for permitting its escape therefrom, a plurality of sets of catalyst holders in the casing, the holders of each of the sets being spaced apart and the different sets being also spaced apart to provide a plurality of tortuous passageways through the casing, and means for supplying a temperature-modifying material to different of the said holders.

2. In catalyzing apparatus, the combination with a casing, of means for supplying material to be catalyzed thereto, and means for permitting its escape therefrom, rows of catalyst holding troughs disposed one above the other in the casing, the troughs of the different rows being disposed in staggered relation, and conduits in the troughs for supplying a medium to modify the temperature of the catalyst placed in said troughs.

3. A catalyzing apparatus, the combination with a casing, of means for introducing vapors to be catalyzed into the lower portion thereof, means for introducing an oxidizing agent into the lower portion of the casing, means for permitting the oxydized materials to escape from the upper portion of the casing, rows of catalyst holding troughs located one above the other within the casing, the troughs of the different rows being disposed in staggered relation, conduits located in the troughs and adapted to be covered by the catalyst placed therein, and means for supplying a temperature modifying medium to the conduits.

In testimony whereof, I affix my signature in the presence of two witnesses.

JAMES McCOBB SELDEN.

Witnesses:
WM. A. IRWIN,
HENRY J. ZAHNER.